United States Patent
Alfonso et al.

(10) Patent No.: US 7,375,763 B2
(45) Date of Patent: May 20, 2008

(54) METHOD AND SYSTEM FOR DE-INTERLACING DIGITAL IMAGES, AND COMPUTER PROGRAM PRODUCT THEREFOR

(75) Inventors: Daniele Alfonso, Monza (IT); Danilo Pau, Sesto San Giovanni (IT); Elio Privitera, Monza (IT); Angelo Schiavone, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 533 days.

(21) Appl. No.: 10/925,884

(22) Filed: Aug. 24, 2004

(65) Prior Publication Data

US 2005/0110901 A1    May 26, 2005

(30) Foreign Application Priority Data

Aug. 26, 2003  (EP) .................... 03425560

(51) Int. Cl.
H04N 7/01 (2006.01)
H04N 11/20 (2006.01)
H04N 5/14 (2006.01)
H04N 5/16 (2006.01)
H04N 9/64 (2006.01)

(52) U.S. Cl. .................. 348/448; 348/452; 348/699; 348/700

(58) Field of Classification Search ............ 348/448, 348/451, 452, 699, 700, 701; 382/300
See application file for complete search history.

(56) References Cited

U.S. PATENT DOCUMENTS

| | | | |
|---|---|---|---|
| 5,546,130 A | 8/1996 | Hackett et al. | 348/447 |
| 5,581,308 A | 12/1996 | Lee | 348/699 |
| 5,661,525 A | 8/1997 | Kovacevic et al. | 348/452 |
| 5,668,608 A | 9/1997 | Lee | 348/699 |
| 5,689,305 A * | 11/1997 | Ng et al. | 375/240.15 |
| 5,703,966 A * | 12/1997 | Astle | 382/236 |
| 5,726,713 A * | 3/1998 | Panis | 375/240.14 |
| 5,745,183 A | 4/1998 | Lam | 348/416 |
| 5,784,114 A | 7/1998 | Borer et al. | 348/452 |

(Continued)

OTHER PUBLICATIONS

Accame, "An Integrated Approach to Block Based Motion Estimation for Video Coding," *IEEE Transactions on Consume Electronics*, 44(1): 52-61, 1998.

(Continued)

*Primary Examiner*—Brian P. Yenke
(74) *Attorney, Agent, or Firm*—Lisa K. Jorgenson; Robert Iannucci; Seed IP Law Group PLLC (57) ABSTRACT

To carry out de-interlacing of digital images there is provided a spatial-type de-interlacing process to be applied to a digital image for obtaining a spatial reconstruction. Furthermore, to the digital image there are also applied one or more temporal-type de-interlacing processes for obtaining one or more temporal reconstructions, and the spatial reconstruction and the one or more temporal reconstructions are sent to a decision module. The decision module applies a cost function to the spatial reconstruction and the temporal reconstructions and chooses from among the spatial reconstruction and the temporal reconstructions the one that minimizes the cost function. Preferential application is to display systems, in particular displays of a cathode-ray type, liquid-crystal type, and plasma type which use a mechanism of progressive scan.

25 Claims, 7 Drawing Sheets

U.S. PATENT DOCUMENTS

| | | | | |
|---|---|---|---|---|
| 5,786,860 | A | 7/1998 | Kim et al. | 348/416 |
| 5,936,676 | A | 8/1999 | Ledinh et al. | 348/452 |
| 5,943,099 | A | 8/1999 | Kim | 348/448 |
| 6,014,181 | A | 1/2000 | Sun | 348/699 |
| 6,262,773 | B1 | 7/2001 | Westerman | 348/448 |
| 6,414,719 | B1 * | 7/2002 | Parikh | 348/448 |
| 6,442,203 | B1 | 8/2002 | Demos | 375/240.16 |
| 6,512,550 | B1 | 1/2003 | de Garrido et al. | 348/452 |
| 6,563,872 | B2 | 5/2003 | Suzuki | 375/240.03 |
| 6,577,345 | B1 * | 6/2003 | Lim et al. | 348/452 |
| 6,606,126 | B1 * | 8/2003 | Lim et al. | 348/452 |
| 6,661,464 | B1 * | 12/2003 | Kokkosoulis et al. | 348/448 |
| 6,891,891 | B2 * | 5/2005 | Pau et al. | 375/240.16 |
| 6,900,846 | B2 * | 5/2005 | Lee et al. | 348/459 |
| 6,940,557 | B2 * | 9/2005 | Handjojo et al. | 348/452 |
| 6,992,725 | B2 * | 1/2006 | Mohsenian | 348/448 |
| 7,015,971 | B2 * | 3/2006 | Sirtori et al. | 348/448 |
| 7,042,512 | B2 * | 5/2006 | Yang et al. | 348/452 |
| 7,057,665 | B2 * | 6/2006 | Jung et al. | 348/452 |
| 7,064,792 | B2 * | 6/2006 | Yang et al. | 348/445 |
| 7,075,581 | B1 * | 7/2006 | Ozgen et al. | 348/448 |
| 7,098,957 | B2 * | 8/2006 | Kim et al. | 348/452 |
| 7,113,222 | B2 * | 9/2006 | Kodama | 348/452 |
| 7,154,556 | B1 * | 12/2006 | Wang et al. | 348/452 |
| 2002/0080284 | A1 | 6/2002 | Kim et al. | 348/700 |
| 2002/0171759 | A1 | 11/2002 | Handjojo et al. | 348/452 |
| 2003/0048278 | A1 | 3/2003 | Ji et al. | 345/606 |
| 2005/0179814 | A1 * | 8/2005 | Pau et al. | 348/448 |

OTHER PUBLICATIONS

Kim, "Block Motion Estimation Based on Spatio-Temporal Correlation," *IEEE Tencon—Digital Signal Processing Applications,*, pp. 955-960, Nov. 1996.

Wiegand, "Block-Based Hybrid Video Coding Using Motion-Compensated Long-Term Memory Prediction," *Telecommunications Institute, University of Erlangen-Nuremberg*, pp. 153-158, 1997.

* cited by examiner

METHOD AND SYSTEM FOR DE-INTERLACING DIGITAL IMAGES, AND COMPUTER PROGRAM PRODUCT THEREFOR

BACKGROUND OF THE INVENTION

1. Field of the Invention

The present invention relates to techniques for digital-image processing, and has been developed with particular attention paid to its possible application to the processing of television images and to the display of the television signal on displays, such as personal-computer displays of the cathode-ray type, liquid-crystal type or plasma type, which use a progressive-scanning mechanism.

Even though in what follows, for reasons of clarity and simplicity of exposition, practically exclusive reference will be made to this application, it must in any case be borne in mind that the significance of application of the invention is more general. The invention is in fact applicable to all techniques of digital-image processing in which there arise operating conditions of the type described in what follows.

2. Description of the Related Art

The television system adopted in Europe, i.e., the Phase-Alternate-Line (PAL) system, is characterized by a frame frequency of 25 Hz: this means that it is possible to display 25 images or frames per second, each of which is made up of a grid of 720×576 samples, called pixels (picture elements), arranged in rows. In fact, the raster, i.e., the electron beam that draws the image on the television display, operates at a frequency of 50 Hz, and once every second creates on the display 50 half-images, or fields, each of which is sampled at a different instant in time, with a time interval between said fields of one fiftieth of a second. Each field contains alternately the even rows only or else the odd rows only of a complete image. Consequently, the images displayed on the television screen have their even rows belonging to one field, referred to as even field, and their odd rows belonging to another field, referred to as odd field. When the images are divided in this way, they are referred to as "interlaced" images.

The PAL system was originally conceived for systems with cathode-ray displays, but television images are not suited for being displayed on other types of display, such as, for example computer monitors, or modern televisions with plasma or liquid-crystal displays. These systems, in fact, use a display mechanism referred to as "progressive", which each time composes on the display a complete image, and not a single field. A television video sequence in PAL format, displayed on these systems, would cause an unpleasant "mosaic" effect, due to the fact that each image is in effect made up of two different interlaced fields.

To display the images correctly, it is therefore necessary to subject them to a de-interlacing procedure, which provides for reconstruction of a complete image, starting from a single field. In the case of even fields, the odd lines of the image are reconstructed; in the case of odd fields the even lines of the image are reconstructed. The reconstructed lines are then added to the original ones, and a complete image or frame is thus obtained.

The de-interlacing procedure can be carried out in different ways, which can be reduced to two main categories:
motion-compensated procedures; and
non-motion-compensated procedures.

Motion-compensated (or temporal) de-interlacing procedures use motion-estimation techniques for reconstructing a field starting from temporally preceding and subsequent information, whilst non-motion-compensated (or spatial) de-interlacing procedures use spatial interpolation for reconstructing the even or odd rows of a frame, starting from the odd or even rows, respectively.

To carry out the procedure of non-motion-compensated de-interlacing of digital images, it is known to use a procedure referred to as Edge-Line Averaging (ELA).

Figure 1:
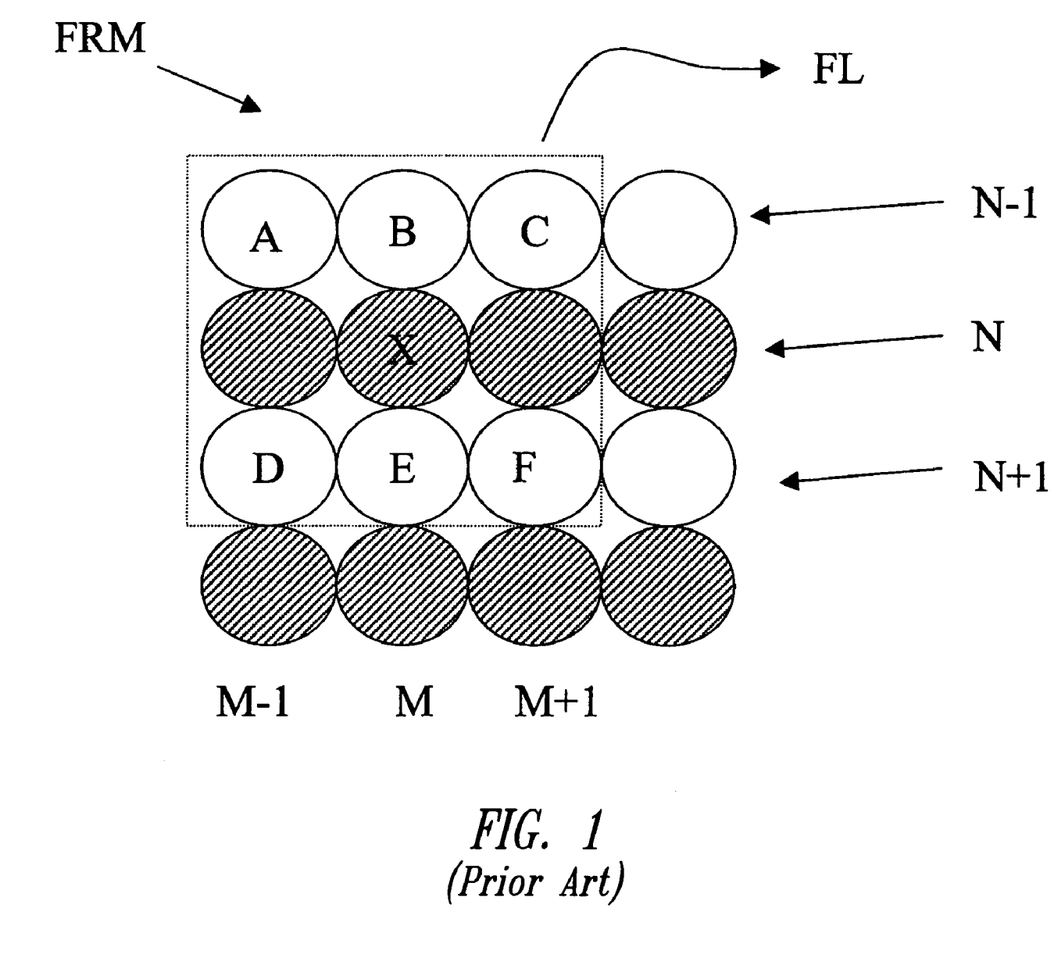

FIG. 1 illustrates a part of the pixels of an image or frame FRM. In this frame FRM, the odd rows that make up a field to be reconstructed MFD are to be reconstructed starting from the even rows. According to the ELA procedure, the pixels belonging to row N, where N is an odd integer, can be reconstructed starting from the adjacent pixels, belonging to the rows N−1 and N+1.

In particular, if a pixel to be reconstructed X of the field MFD is in the position M on the row N of the frame FRM, it can be reconstructed using the pixels in the positions M−1, M and M+1 on the aforesaid rows.

If A, B and C designate the pixels belonging to a work window FL in positions M−1, M and M+1 in the row N−1 of the frame FRM, and D, E and F designate the pixels in positions M−1, M and M+1 in the row N+1 of the frame FRM, the pixel to be reconstructed X can be reconstructed using the following interpolation formula:

$$X = \begin{cases} \dfrac{A+F}{2} & \text{if } |A-F| < |B-E|, |C-D| \\ \dfrac{B+E}{2} & \text{if } |B-E| < |A-F|, |C-D| \\ \dfrac{C+D}{2} & \text{if } |C-D| < |A-F|, |B-E| \end{cases} \quad (1)$$

In other words, as can also be inferred from FIG. 1, the pixel X to be reconstructed is reconstructed by linear interpolation of the most correlated pair of pixels belonging to the nearest rows of the field of opposite parity, the correlation between two pixels being defined as the distance of the respective values.

Figure 2:
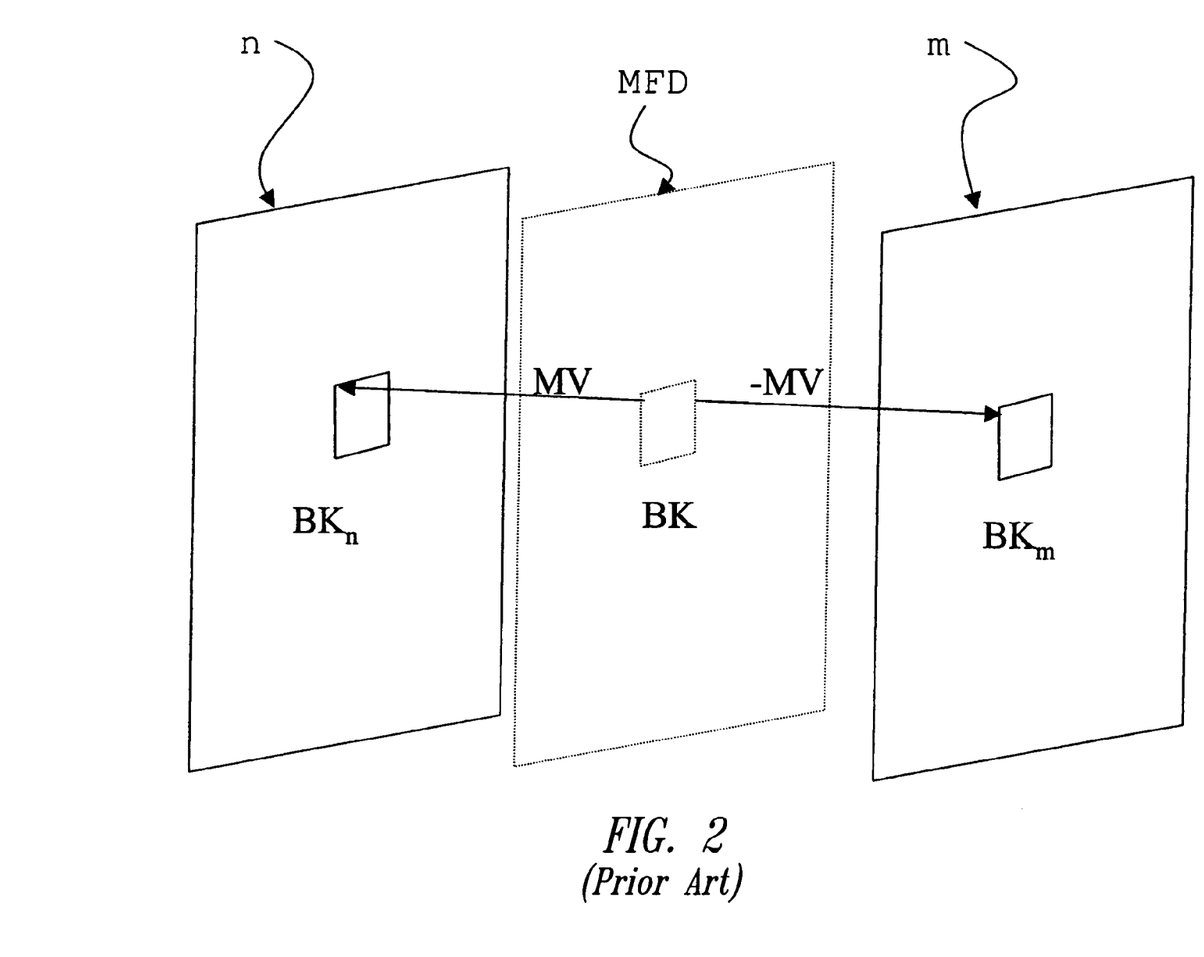

To carry out, instead, the procedure of motion-compensated, or temporal, de-interlacing of digital images for composing the field to be reconstructed MFD, illustrated in FIG. 2, this field to be reconstructed MFD is, instead, broken down into a series of blocks BK. Each block BK is reconstructed by interpolation of two blocks $BK_m$, $BK_n$ belonging to another two frames, of the same parity, that temporally precede and follow, respectively, the frame to be reconstructed containing the field to be reconstructed MFD. The preceding frame includes a field n that contains the block $BK_n$ and the following frame includes a field m that contains the block $BK_m$.

The pair of blocks is chosen by minimizing a correlation function, such as, for example, the Sum-of-Absolute-Differences (SAD) function, which is defined as follows: if SAD(x,y) is the SAD function between a preceding block $BK_n$ of W×H pixels (where W and H are positive integers), set in a position (x,y) in the preceding field n, which has pixels of intensity $V_n(x+i,y+j)$, and a corresponding subsequent block $BK_m$, set in a position (x+dx,y+dy) in the subsequent field m, which has pixels of intensity $V_m(x+dx+i,y+dy+j)$, then the SAD function is:

$$SAD(x, y) = \sum_{i=0}^{W} \sum_{j=0}^{H} V_n(x+i, y+j) - V_m(x+dx+i, y+dy+j) \qquad (2)$$

The position of the preceding reference block $BK_n$ with respect to the block BK to be reconstructed is indicated by a motion vector MV, whilst the position of the subsequent block $BK_m$ is indicated by an equal and opposite motion vector designated by −MV in FIG. 2. In this case, the term "balanced motion estimation" is used, in so far as the two reference blocks, the preceding one $BK_n$ and the subsequent one $BK_m$, are in an opposite position with respect to that of the block BK to be reconstructed.

For minimizing the correlation function, whether it is the aforesaid SAD function or any other function, it is possible to use any technique of motion estimation, such as for example the full-search technique, which verifies exhaustively all the possibilities within a certain search area, called "search window".

The de-interlacing procedures listed above, however, do not succeed in guaranteeing optimal performance in all the situations that can occur during processing of a video sequence.

BRIEF SUMMARY OF THE INVENTION

One embodiment of the present invention provides a solution that guarantees optimal performance in the operations of de-interlacing of an interlaced digital image.

According to the present invention, one embodiment is directed to a method, another to the corresponding system, and yet another to the corresponding computer product directly loadable into the memory of a digital computer such as a processor.

Basically, the solution described herein provides for making a choice between different procedures for de-interlacing digital images that generate different reconstructions, by an operation of evaluation and minimization of a cost function. There are also proposed improved procedures of digital image de-interlacing of a spatial and temporal type.

As compared to the known solutions, a solution proposed herein enables a reconstruction to be obtained without appreciable visual defects.

BRIEF DESCRIPTION OF THE SEVERAL VIEWS OF THE DRAWINGS

The invention will now be described, purely by way of non-limiting example, with reference to the annexed drawings, in which:

FIG. 1 and FIG. 2, which correspond to the known art, have already been described previously;

DETAILED DESCRIPTION OF THE INVENTION

The de-interlacing procedure proposed provides basically for providing a non-motion-compensated (or spatial) de-interlacing procedure as well as a motion-compensated (or temporal) de-interlacing procedure designed to produce reconstructions of improved quality, as well as making a decision among the reconstructions originated by said spatial and temporal procedures, introducing an appropriate cost function for making this decision.

There is thus described hereinafter, first of all, a non-motion-compensated digital-image de-interlacing procedure which improves the non-motion-compensated procedure for de-interlacing digital images of the ELA type described previously with reference to FIG. 1 by introducing the following operations:

an operation of extension of the work window;

operations designed to obtain a sub-pixel degree of precision;

an operation of adaptive sizing of the work window; and an operation of post-processing and final filtering of the spatial reconstruction.

Figure 3:
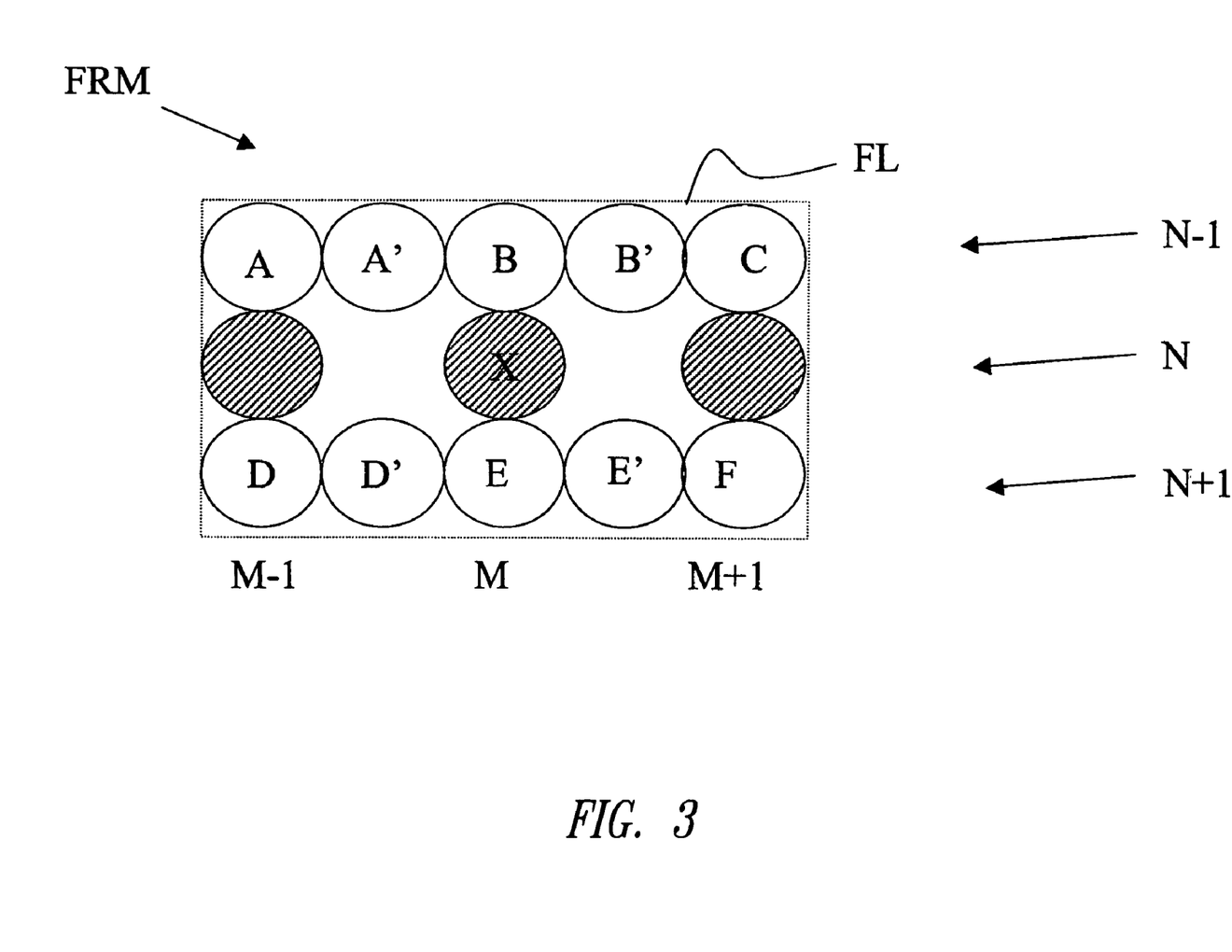
FIG. 3 illustrates a diagram corresponding to an operation of a procedure of spatial de-interlacing comprised in one method according to the invention.

These operations are now described in greater detail, with reference to FIG. 3.

As regards the operation of extension of the work window FL, the spatial de-interlacing procedure proposed does not envisage simply considering just three pairs of pixels (as described previously with reference to FIG. 1) among which the most correlated pair is to be chosen, but rather it envisages the use of a number of pairs P of pixels greater than or equal to three.

The advantage that is obtained extending in this way the work window FL from the immediately adjacent pixel to other nearby pixels is an increase in the likelihood of finding a best correlation, the result being that the reconstructed pixel will be more similar to the adjacent ones, and the overall quality of the final image will thus be improved.

The contribution of the operation of extension of the work window FL described above can be evaluated in association with the operation of adaptive sizing of the work window FL, which will be described in what follows.

The procedure of non-motion-compensated de-interlacing of digital images of the ELA type described above with reference to FIG. 1 considers only the original pixels that are in the row above and in the row below the one containing the pixel X to be reconstructed. The non-motion-compensated de-interlacing procedure proposed provides for increasing the quality of the spatial reconstruction by considering, in addition to the original pixels, also the pixels in the intermediate positions, i.e., implementing operations designed to obtain a sub-pixel degree of precision.

For example, in the case of a number of pairs P equal to three, it is possible to define new pixels A', B', D' and E', as shown in FIG. 3, where the pixel A' is located between the pixel A and the pixel B, the pixel B' between the pixel B and the pixel C, the pixel D' between the pixel D and the pixel E, and the pixel E' between the pixel E and the pixel F. In this case, the relation (1) for calculating the pixel X is transformed as indicated below:

$$X = \begin{cases} \dfrac{A+F}{2} & \text{if } |A-F| < |B-E|, |C-D|, |A'-E'|, |B'-D'| \\ \dfrac{A'+E'}{2} & \text{if } |A'-E'| < |A-F|, |B-E|, |C-D|, |B'-D'| \\ \dfrac{B+E}{2} & \text{if } |B-E| < |A-F|, |C-D|, |A'-E'|, |B'-D'| \\ \dfrac{B'+D'}{2} & \text{if } |B'-D'| < |A-F|, |B-E|, |C-D|, |A'-E'| \\ \dfrac{C+D}{2} & \text{if } |C-D| < |A-F|, |B-E|, |A'-E'|, |B'-D'| \end{cases} \quad (3)$$

The new pixels A', B', E' and D' can be calculated starting from the original pixels horizontally adjacent thereto. By way of example, but not necessarily, it is possible to define the pixel A' simply by linear interpolation:

$$A' = \frac{A+B}{2} \quad (4)$$

Once the operations described above designed to obtain a sub-pixel degree of precision have been introduced, it is possible to introduce the operation of adaptive sizing of the work window FL in the procedure of non-motion-compensated de-interlacing of digital images of the ELA type.

The procedure for non-motion-compensated de-interlacing of digital images of the ELA type according to the known art identifies the pair of pixels having the maximum correlation by simply considering the distance between the values of the two pixels. Not necessarily does this procedure enable the maximum visual quality to be achieved, in so far as the pair having the maximum correlation is not always the right one to be interpolated. To overcome this drawback, there are imposed restrictions on the procedure of search for the pair having the maximum correlation among the possible pairs P of pixels. This can be obtained by adaptively varying the number of pairs P each time considered, i.e., the size of the work window FL.

To provide a better example, consider a first pixel to be reconstructed X1 and a second pixel to be reconstructed X2, where the first pixel to be reconstructed X1 has already been reconstructed using a first-number P1 of pairs of pixels, whilst the second pixel to be reconstructed X2 has still to be reconstructed using a work window that comprises a second number P2 of pairs of pixels; the second number P2 of pairs can then be determined starting from the first number P1 of pairs applying the following rules:

- if the first pixel to be reconstructed X1 has been reconstructed using the pair of original pixels corresponding to the vertical direction, then P2=P1−1;
- if the first pixel to be reconstructed X1 has been reconstructed using the pair of original pixels corresponding to the steepest slope possible (both towards the right and towards the left), then P2=P1+1;
- in all the other cases, P2=P1;
- in any case, it must be always P2≧3 and P2≦Pmax, where Pmax indicates a maximum number of pixels determined a priori.

From the simulations carried out, it has been found experimentally that an adequate value for the maximum number of pairs of pixels Pmax is seven. A further extension of the work window would take into account pixels that are located at an excessive distance apart from one another, and hence, in effect, uncorrelated.

Once an even field has been reconstructed on the basis of an odd field, or vice versa, applying the spatial de-interlacing procedure just described, it is necessary to put this even field and this odd field together to obtain the final complete image. A similar operation can be executed by simply alternating the original rows with the reconstructed ones, but this can lead to an undesirable effect of distortion, in the case where some pixels are reconstructed in an excessively approximate manner. This drawback can be overcome by carrying out an appropriate post-processing operation, i.e., a filtering operation, on each pixel to be reconstructed X, to obtain a new reconstructed pixel X' filtered according to the original pixels A and B respectively in a top position and a bottom position with respect to the pixel to be reconstructed X, i.e., by applying a vertical FIR filter defined as:

$$X' = f(X, A, B) \quad (5)$$

A possible choice for the filtered reconstructed pixel X' can for example be the following:

$$X' = \frac{A + 2X + B}{4} \quad (6)$$

Moreover, the filtering operation just described can be dynamically varied according to the degree of correlation of the pixel to be reconstructed X with the pixels A and B, for the purpose of obtaining the best performance possible. In other words, there can be chosen a first filtering function f1 if the relations |A−X|<T or |B−X|<T are verified, and a second filtering function f2 otherwise. T indicates an appropriate threshold value determined heuristically, and in this case equal to 15, since the values of the pixels are comprised between 0 and 255. In this case, the filtering functions f1 and f2 are determined via the following coefficients:

f1=(0.125, 0.75, 0.125)
f2=(0.25, 0.5, 0.25)

The first filtering function f1 is used when the pixel to be reconstructed X is already sufficiently correlated with the two adjacent pixels, the need to increase to no purpose the correlation being thus prevented. Instead, the second filtering function f2 is used when the initial correlation is low with the aim of increasing it.

Note that the choice of coefficients that are powers of ½ advantageously favors an immediate hardware implementation of the procedure.

The above post-processing operation can be considered similar to the smoothing operation, commonly used in the field of digital-image processing. It is to be noted, however, that the smoothing operation is used for smoothing out the outlines of objects, when these are too evident, whilst in the context of the spatial-de-interlacing procedure proposed, the post-processing operation described above is necessary for restoring the correct outline of an object, in the case where it has been reconstructed in an approximate way. Furthermore, normally, the smoothing operation is obtained by applying a two-dimensional filter with fixed coefficients. In the case of the operation of post-processing and filtering described, instead, a one-dimensional non-linear adaptive filter, purposely designed for increasing the correlation between the pixel to be reconstructed X and the original pixels vertically adjacent thereto. Finally, application to the spatial-de-interlacing procedure of a simple conventional smoothing operation would cause an increase of the saw-toothing of the inclined edges, which is aesthetically undesirable, said increase being due to the alternation of the original rows and the rows reconstructed in such a way as to resemble excessively the original ones.

Hence, at the expense of just a minimal increase in computational complexity, the procedure of non-motion-compensated, or spatial, digital-image de-interlacing proposed enables a sensible improvement to be achieved as compared to the known methods, both in terms of PSNR (Peak Signal-to-Noise Ratio) obtained and in qualitative terms, i.e., by direct observation of the video sequences on television sets of professional quality.

The de-interlacing procedure moreover exploits an improved temporal de-interlacing procedure, in which the motion-estimation de-interlacing technique is extended and modified with respect to the motion-estimation procedure for video compression described in the European patent application EP-A-1152621, which corresponds to U.S. patent application Ser. No. 09/849,503, which was published on Jan. 31, 2002 as U.S. Publication No. US-2002-0012396A1, all of which are incorporated herein by reference in their entirities.

The above motion-estimation procedure for video compression is designed to operate in association with low-complexity video-compression systems, such as for example the H.263 or H.263+ coding systems. In these systems, motion estimation is used to predict a macroblock of 16×16 pixels belonging to the current image, with respect to another macroblock, called predictor, which is in an image preceding the current one. The motion-estimation procedure operates in such a way as to find the position of the predictor macroblock with respect to the current macroblock, identifying the predictor that minimizes a certain cost function, such as, for example, the SAD function defined by the relation (2) provided above.

In the case of a temporal de-interlacing procedure, as explained previously with reference to FIG. 2, the task is different in so far as the aim is to find a pair of blocks.

In this case, the motion-compensated de-interlacing procedure comprises two distinct operations:

an operation of testing of a number Q of vectors temporally and spatially preceding the one referring to the current macroblock, with final choice of the best vector; and an operation of application of a refining grid, made up of R points, in the neighborhood of the position pointed by the best vector found in the preceding step.

These two operations are followed by a conclusive operation of choice of the best position.

In the case where it is desired to carry out a balanced estimation, the proposed procedure operates in each step in such a way as to generate a backward motion vector MV, which points to the temporally subsequent field, and a forward motion vector −MV, which is equal and opposite and points to the temporally preceding fieid, in a similar way to what has been illustrated previously with reference to FIG. 2; the total number of vectors tested is hence Q+R.

There are, however, introduced further improvements to increase the performance of the temporal de-interlacing procedure.

Figure 4:
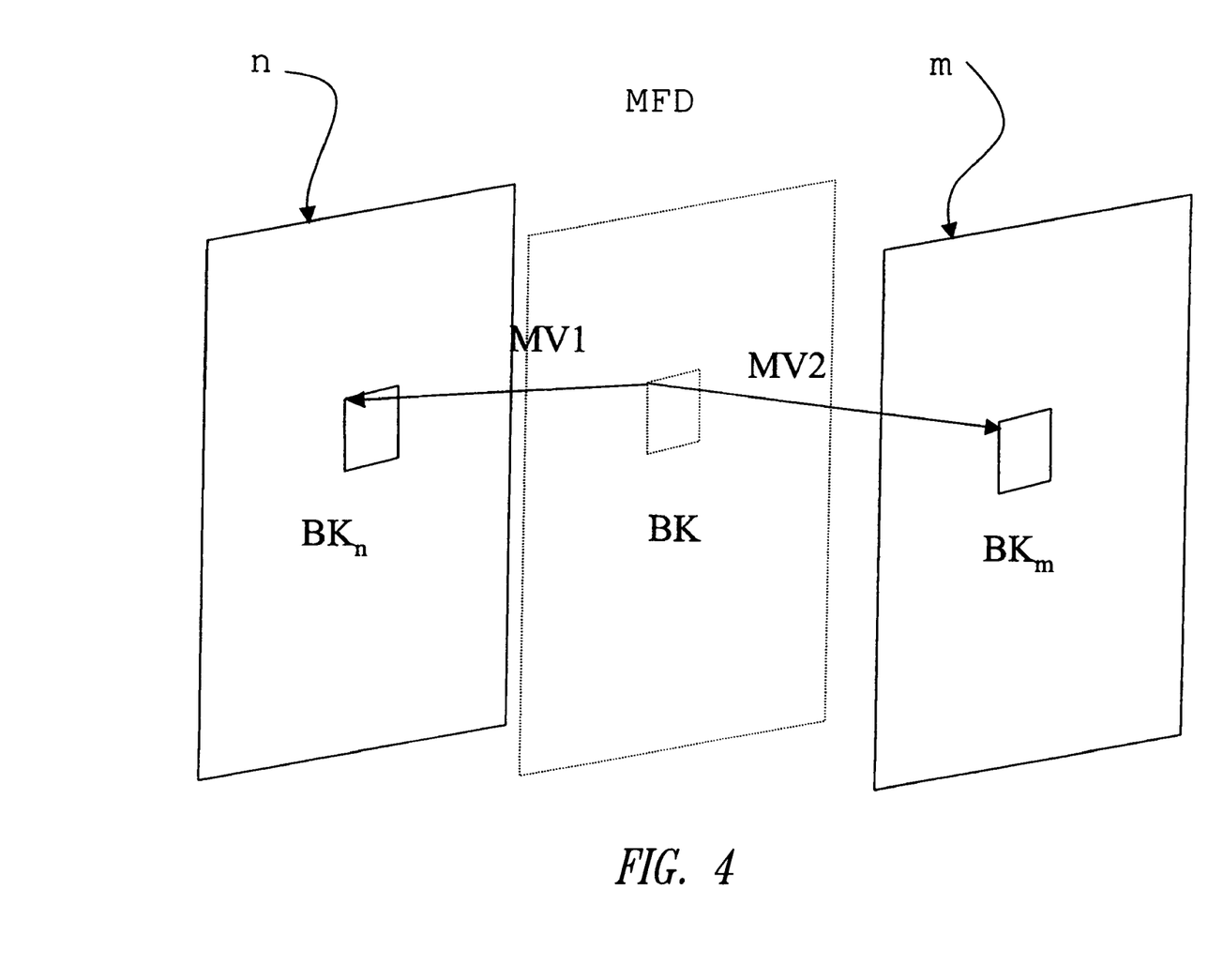
FIG. 4 illustrates a diagram corresponding to an operation of a procedure of temporal de-interlacing comprised in the method of FIG. 3.

In the case of non-balanced estimation, there is proposed elimination of the limitation represented by balanced estimation, by operating in such a way that the procedure will generate at each step two distinct vectors, as illustrated in FIG. 4: a first backward vector MV1 that points to the preceding field n and a second forward vector MV2 that points to the subsequent field m. In this case, the second vector MV2 is in general different in value and sign from the first vector MV1.

The first backward vector MV1 and the second forward vector MV2 are obtained applying two different refining grids in the operation of application of a refining grid of the temporal de-interlacing procedure proposed, a first grid referring to the preceding field and a second grid to the subsequent field.

It is therefore necessary to test all the possible combinations of the R points of the first grid with the Q points of the second grid, for a total of R×Q different tests to be carried out.

Since the hypothesis underlying balanced estimation is a linear movement of an object from the preceding field n to the subsequent field m with respect to the current field, the improvement just described removes said hypothesis, since it enables the movements of an object to be approximated by a broken line, thus obtaining as a final result a greater precision of the procedure.

Figure 5:
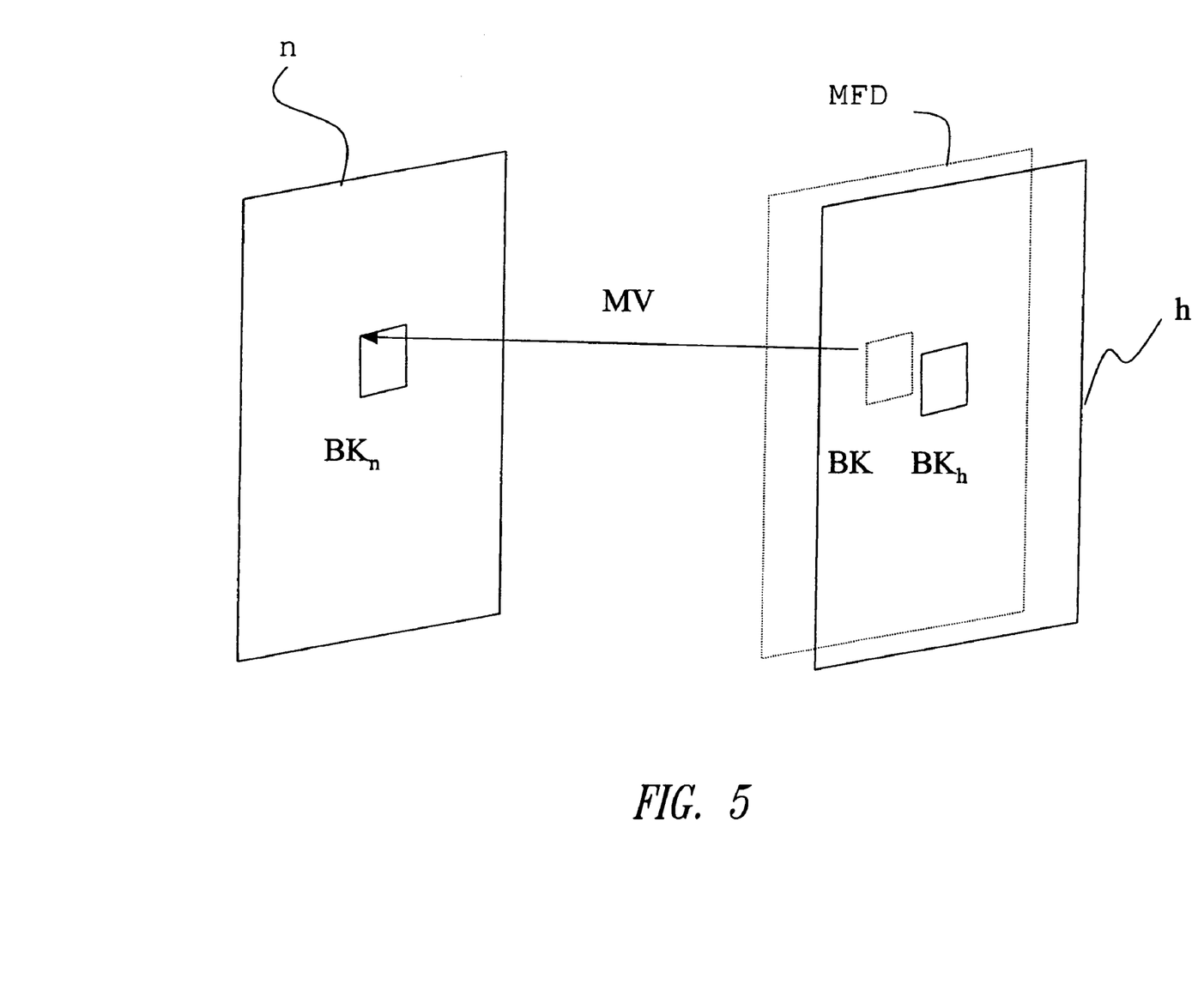
FIG. 5 illustrates a diagram corresponding to an operation of a procedure of temporal de-interlacing comprised in the method of FIG. 3.

In the case of bi-directional estimation, motion estimations, whether balanced or non-balanced, identify the movement of an object which, hypothetically, shifts from the field n preceding to the field m subsequent to the field to be reconstructed MFD. It is, however, possible for an object to disappear as it passes from one field to the other, for example because it exits the display area or because there is a change of scene in the video sequence. In this case, the motion estimations described previously would fail, since they would seek a correlation that in actual fact is absent. To solve this problem, a one-directional motion estimation can be carried out, which reconstructs the current block BK starting from just the preceding field n, which is the case illustrated in FIG. 5, or else starting from just the subsequent field m. In this case, the correlation is sought between a block belonging to the preceding field n (or else the subsequent block m) and a block $BK_h$ belonging to the current field of parity opposite to that of the current field to be reconstructed. The field with opposite parity is designated by h. This block $BK_h$ is the homologue of the current block BK to be reconstructed, i.e., it has the same spatial co-ordinates within the respective field. In this case, it is assumed that the field h of parity opposite to that of the field to be reconstructed constitutes a valid approximation for minimization of the chosen cost function.

The motion-compensated de-interlacing procedure proposed can operate with a high sub-sampling precision, such as, for example, a quarter or even one eighth of a pixel, given that subsampling to half a pixel does not provide a precision sufficient for carrying out high-quality de-interlacing.

In this case, sub-sampling is obtained by successive approximations, i.e., by means of successive filtering steps that bring the precision from one pixel to half a pixel, and subsequently from half a pixel to a quarter of a pixel, and then (optionally) from a quarter to one eighth of a pixel. The sub-sampling operations are performed by different filters, designed for obtaining the maximum video-mage quality possible.

As regards the size of the blocks, it is, in general, advisable to operate with a size of the blocks of 16×16 pixels since this is the size adopted for motion estimation by the various video-compression standards, such as H.263 and H.263+. The video compression procedure, for example, is also suited for the APM mode of H.263+, by splitting a macroblock of 16×16 pixels into four blocks of 8×8 pixels, for each of which a distinct motion vector is generated.

In the case of a temporal de-interlacing procedure, operating with a size of the blocks of 16×16 pixels does not, however, lead to obtaining a sufficient precision. Hence, the proposed procedure starts from a size of 8×8 pixels, then passes to 4×4 and 2×2 pixels, in a similar way to what has been already adopted for the H.263+ coding, i.e., applying subsequently just the refinement operation in order to identify the four 4×4 vectors starting from the individual 8×8 vector, and subsequently four 2×2 vectors starting from each individual 4×4 vector.

The motion-compensated de-interlacing procedure just described enables a considerable improvement to be achieved as compared to the known methods; both in terms of Peak Signal-to-Noise Ratio (PSNR) measured and in qualitative terms, i.e., by direct observation of the video sequences on television sets of professional quality.

By combining the procedure of non-motion-compensated de-interlacing of digital images of an ELA type and the motion-compensated procedure described above, as illustrated schematically in FIG. 6, it is possible to obtain a digital-image de-interlacing method that enables optimal performance.

Neither the spatial procedure nor the temporal procedure just described, in fact, is able to guarantee optimal performance in all the situations that can occur during processing of a video sequence; for this reason, it is necessary to choose each time the technique that produces the best reconstruction. This can be obtained by means of an appropriate decision module to be cascaded to the two blocks of spatial and temporal de-interlacing.

Figure 6:
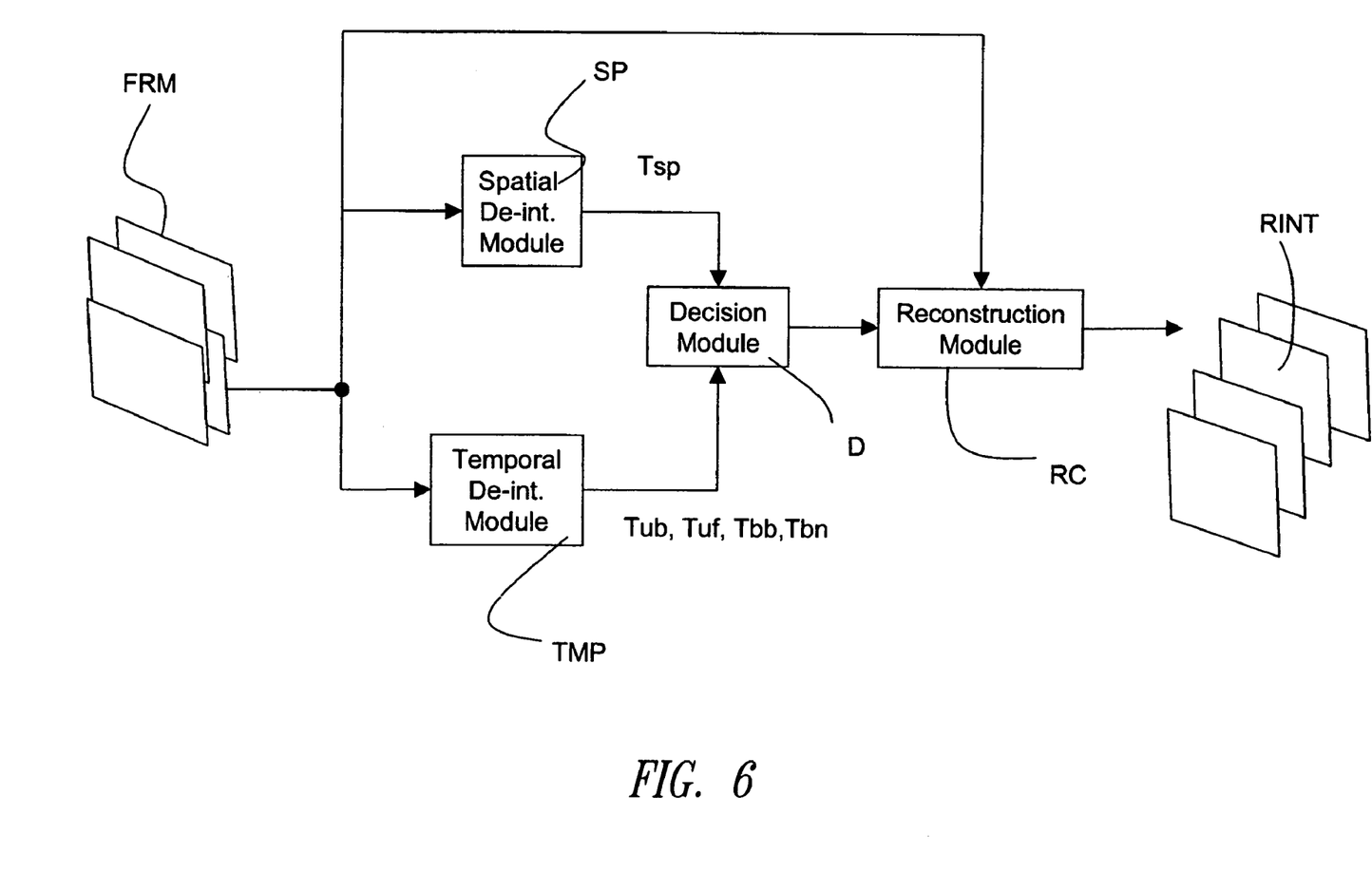
FIG. 6 illustrates a schematic circuit diagram of a de-interlacing system implementing the method of FIG. 3.

In particular, with reference to FIG. 6, there is illustrated the frame FRM, i.e., an interlaced video image, which is sent in parallel at input to a spatial-de-interlacing module SP, which implements the improved non-motion-compensated digital-image de-interlacing procedure described previously with reference to FIG. 3, and to a temporal-de-interlacing module TMP, which implements the improved motion-compensated digital-image de-interlacing procedure described previously with reference to FIGS. 4 and 5. The spatial-de-interlacing module SP supplies at output a spatial reconstruction Tsp, whilst the temporal-de-interlacing module TMP supplies at output a backward temporal reconstruction Tub, given by the unidirectional estimation on the preceding field or backward field, a forward temporal reconstruction Tuf, given by the unidirectional estimation on the subsequent field or forward field, a balanced temporal reconstruction Tbb, given by the balanced bi-directional estimation, and a non-balanced temporal reconstruction Tbn, given by the non-balanced bi-directional estimation.

For each square block BK of N×N pixels that composes a reconstructed image RINT at output of the system, a decision module D receives the corresponding spatial reconstruction Tsp and the temporal reconstructions Tub, Tuf, Tbb and Tbn.

To each of these reconstructions, or predictors, Tsp, Tub, Tuf, Tbb and Tbn, there is assigned in the decision module D a figure of merit obtained by applying a determined cost function.

As a cost function the variance of the block being examined may, for example, be chosen.

In fact, given the block BK made up of N×N pixels of values P (i,j), its M-order moment, $\mu_M$, is:

$$\mu_M = \frac{1}{N^2} \sum_{i=0}^{N} \sum_{j=0}^{N} (p(i,j))^M \quad (7)$$

and the variance var is thus defined as the difference between the second-order moment and the first-order moment (i.e., the mean) squared, i.e.,:

$$var = \mu_2 - \mu_1^2$$

Once the variance var, corresponding to a cost, has been calculated for each one of the predictors Tsp, Tub, Tuf, Tbb and Tbn of the block BK to be reconstructed, in the decision module D there is applied a function for choice of the optimal predictor.

As a choice function in the decision module D, there can for example be applied a median filter, i.e., a filter that, given a set of values, returns the value that occupies the intermediate position in said set of values.

For example, the median of the set of values (10, 80, 20) is 20; the median of the set of values (10, 80, 20, 30) is 25, which is the mean of the two intermediate values 20 and 30.

Hence, in the decision module D there is chosen, as best reconstructed block BK for composing the reconstructed image RINT, the block that corresponds to the median of the variances of the individual spatial and temporal predictors. This operation of reconstruction is carried out by means of an appropriate reconstruction module RC set at the output of the decision module D.

The reconstruction module RC receives, from the decision module D, the blocks BK chosen by means of the median filter and recomposes the field to be reconstructed MFD. Moreover, this reconstruction module RC receives at input the frame FRM, in such a way as to be able to supply at output the reconstructed image RINT with the fields arranged in an ordered way for a progressive-scan display.

The solution described above enables considerable advantages to be achieved as compared to known solutions.

The de-interlacing method described guarantees optimal performance in all the situations that can occur during processing of a video sequence, it being able to choose from time to time the technique that produces the best reconstruction. This is obtained by carrying out in an appropriate decision module, operations of application of convenient cost and choice functions, so as to prevent defects of formation of blocks from arising in the reconstructed image.

Figure 7:
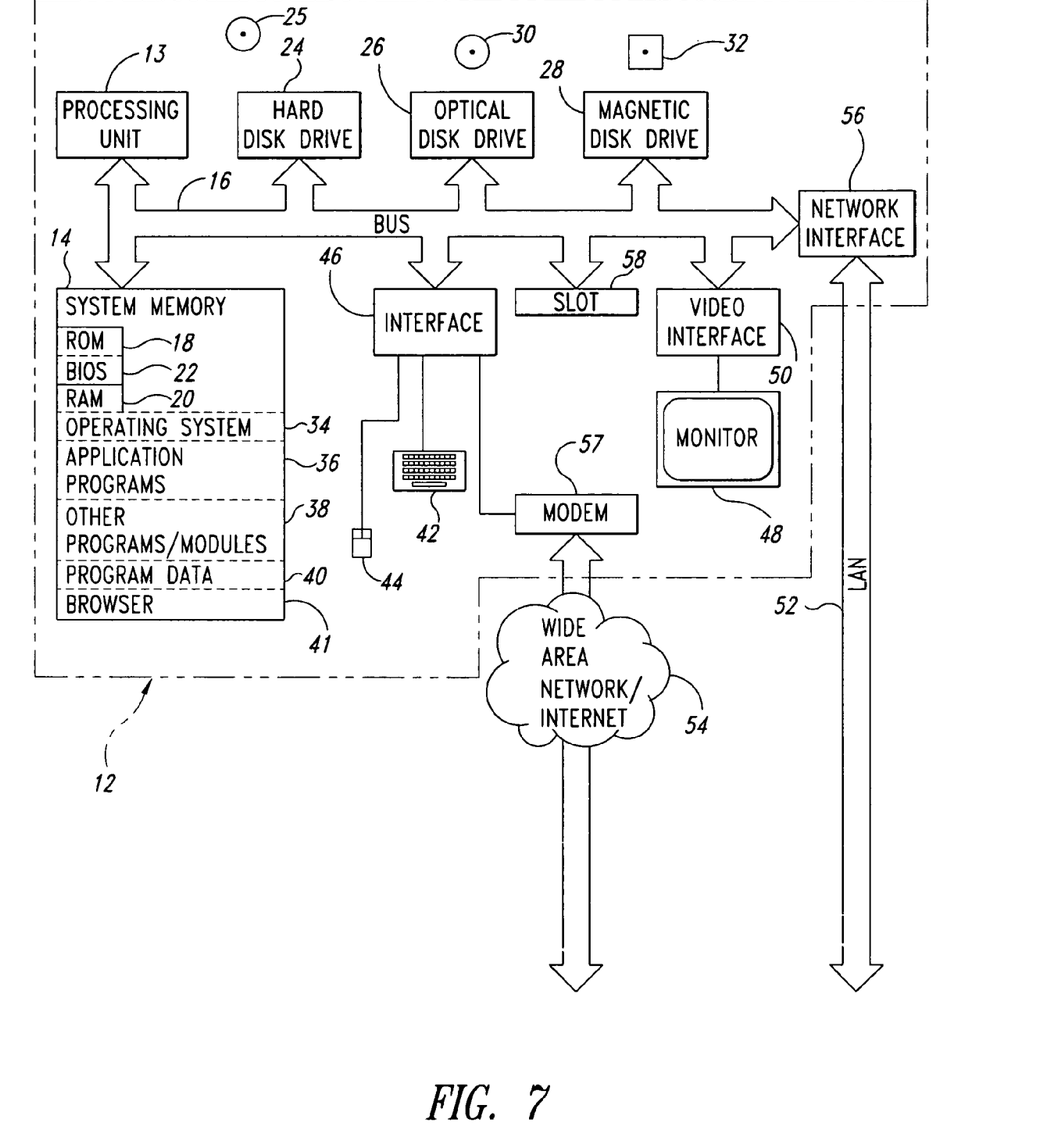
FIG. 7 is a diagram of a computer system that can be used to implement the present invention.

Those skilled in the art will recognize that the method described above may be implemented in a general purpose computer system. FIG. 7 and the following discussion provide a brief, general description of a suitable computing environment in which the invention may be implemented. Although not required, at least one embodiment of the invention can be implemented: in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 7, a personal computer referred to herein as a computing system 12 includes a processing unit 13, a system memory 14 and a system bus 16 that couples various system components including the system memory 14 to the processing unit 13. The processing unit 13 may be any logical processing unit, such as one or more central processing units (CPUs), digital signal processors (DSPs), application-specific integrated circuits (ASIC), etc. Unless described otherwise, the construction and operation of the various blocks shown in FIG. 7 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 12, such as during startup.

The computing system 12 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 13 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 12. Although the depicted computing system 12 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 12 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 7 as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 12 through input devices such as a keyboard 42 and a pointing device such as a mouse 44. Other input devices can include a microphone, joystick, game pad, scanner, etc.

These and other input devices are connected to the processing unit 13 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 12 can include other output devices such as speakers, printers, etc.

The computing system 12 can operate in a networked environment using logical connections to one or more remote computers. The computing system 12 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the computing system 12 is connected to the LAN 52 through an adapter or network interface 56 (communicatively linked to the bus 16). When used in a WAN networking environment, the computing system 12 often includes a modem 57 or other device for establishing communications over the WAN/Internet 54. The modem 57 is shown in FIG. 1 as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 7 are only some examples of establishing communication links between computers, and other links may be used, including wireless links.

The computing system 12 may include one or more interfaces such as slot 58 to allow the addition of devices either internally or externally to the computing system 12. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processing unit 13 for execution. Such a medium may take many forms, including but not limited to, non-volatile media, volatile media, and transmission media. Non-volatile media includes, for example, hard, optical or magnetic disks 25, 30, 32, respectively. Volatile media includes dynamic memory, such as system memory 14. Transmission media includes coaxial cables, copper wire and fiber optics, including the wires that comprise system bus 16. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing unit 13 for execution. For example, the instructions may initially be carried on a magnetic disk of a remote computer. The remote computer can load the instructions into its dynamic memory and send the instructions over a telephone line using a modem. The modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processing unit 13 retrieves and executes the instructions. The instructions received by system memory 14 may optionally be stored on storage device either before or after execution by processing unit 13.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Of course, without prejudice the principle of the invention, the details of construction and the embodiments may vary widely with respect to what is described and illustrated herein, without thereby departing from the scope of the present invention, as defined by the annexed claims.

It may be noted, in particular, that the procedure proposed can be applied indifferently both to the European television system PAL and to the American television system NTSC, as well as to high-definition TV.

The invention claimed is:

1. A method for de-interlacing digital images, comprising:
spatial de-interlacing a digital image to obtain a spatial reconstruction;
applying, to said digital image, one or more de-interlacing procedures of a temporal type to obtain one or more temporal reconstructions; and selecting from among said spatial reconstruction and said one or more temporal reconstructions, said selecting operation including:
obtaining a first cost function result by applying a cost function to said spatial reconstruction,
obtaining one or more second cost function results by applying the cost function to said one or more temporal reconstructions, and
choosing whichever of said spatial reconstruction and temporal reconstructions minimizes said cost function by comparing the first and second cost function results, wherein said spatial de-interlacing operation provides for operating on a work window of pixels of said digital image adjacent to a pixel to be reconstructed by performing linear interpolation on pairs of pixels belonging to said work window, and said spatial de-interlacing operation further comprises the following operations:
extending the work window to a number of pairs of adjacent pixels greater than or equal to three; and
adaptively sizing said work window, wherein adaptively sizing said work window includes varying in an adaptive way a number of pairs of pixels that are considered during each instance of the linear interpolation operation, wherein the adaptively varying operation comprises the steps of:
using a first number of pairs of pixels for reconstructing a first pixel; and
using for reconstructing a second pixel a work window that comprises a second number of pairs of pixels, the second number of pairs of pixels being determined starting from the first number of pairs of pixels according to the following criteria:
if the first pixel has been reconstructed using a pair of pixels corresponding to the vertical direction, then the second number of pairs of pixels is equal to the first number of pixels minus one;
if the first pixel has been reconstructed using the pair of original pixels corresponding to a steepest slope possible, then the second number of pairs of pixels is equal to the first number of pairs of pixels plus one;
in all the other cases, the second number of pairs of pixels is equal to the first number; and
in any case, the second number of pairs of pixels must be greater than or equal to three and smaller than or equal to a maximum number of pairs of pixels determined a priori.

2. The method according to claim 1, wherein said digital image includes a field to be reconstructed which includes a plurality of blocks to be reconstructed, wherein said spatial reconstruction and said one or more temporal reconstructions correspond to one of the blocks to be reconstructed and wherein the applying and selecting operations are repeated for each of the plurality of blocks to be reconstructed.

3. The method according to claim 1 wherein said cost function is a variance of said spatial reconstruction and said one or more temporal reconstructions with respect to a block to be reconstructed of the digital image.

4. The method according to claim 1 wherein said operation of choosing, from among said spatial reconstruction and said one or more temporal reconstructions, the reconstruction that minimizes said cost function is obtained by applying a median-filter function.

5. The method according to claim 1 wherein said spatial de-interlacing further comprises operations suitable for obtaining a sub-pixel degree of precision.

6. The method according to claim 1 wherein said spatial de-interlacing comprises an operation of post-processing and final filtering of the spatial reconstruction.

7. The method according to claim 6, wherein said operation of post-processing and final filtering of the spatial reconstruction is varied dynamically according to a degree of correlation with a pixel being reconstructed.

8. A method for de-interlacing digital images, comprising:
spatial de-interlacing a digital image to obtain a spatial reconstruction;
applying, to said digital image, one or more de-interlacing procedures of a temporal type to obtain one or more temporal reconstructions; and
selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function, wherein said applying operation includes:
reconstructing a field to be reconstructed of the digital image by dividing the field into blocks to be reconstructed, reconstructing by interpolation of blocks belonging to a preceding field and a subsequent field, and minimizing a correlation function, wherein reconstructing by interpolation includes:
testing a number of motion vectors temporally and spatially preceding a current one of the blocks to be reconstructed;
choosing a best vector from among the number of motion vectors;
applying a refining grid in a neighborhood of a position pointed by the best vector; and choosing a best position, in one of the preceding and subsequent fields, corresponding to the current block based on the operation of applying the refining grid.

9. The method according to claim 8, wherein said one or more temporal de-interlacing procedures comprise a procedure of non-balanced estimation, which moreover comprises the operations of:
generating, during said testing operation, a first vector that points to the preceding field and a second vector that points to the subsequent field with respect to the field to be reconstructed of the digital image; and
obtaining said first vector and said second vector by applying, during said operation of applying a refining grid, a first grid corresponding to the preceding field and a second grid corresponding to the subsequent field.

10. The method according to claim 8 said one or more temporal de-interlacing procedures comprise a procedure of unidirectional estimation, which further comprises the operation of reconstructing the current block staffing from just one of the preceding and subsequent fields by performing said operations of testing and of applying a grid on a block belonging to the one of the preceding and subsequent fields, and on a block belonging to a field of parity opposite to the field to be reconstructed.

11. A method for de-interlacing a digital image that includes interlaced first and second fields, the first field including first and second blocks of pixels, comprising:
spatial de-interlacing the first block to obtain a spatial reconstruction;
temporal de-interlacing the second block to obtain a temporal reconstruction; and
constructing a reconstructed image by combining the spatial reconstruction and temporal reconstruction with the second field, wherein the spatial de-interlacing step includes, for each pixel of the first block:
constructing a work window that includes pixels of the second field adjacent to the pixel of the first block, and intermediate pixels created based on a plurality of the pixels of the second field adjacent to the pixel of the first block; and
creating for the spatial reconstruction a reconstructed pixel corresponding to the pixel of the first block by performing linear interpolation on pairs of pixels of the work window, wherein the first block includes first and second pixels and the spatial de-interlacing step includes adaptively sizing the work window constructed for the second pixel based on the creating step performed for the first pixel, wherein the temporal de-interlacing includes:
testing a number of motion vectors temporary and spatially preceding a current one of the blocks to be reconstructed;
choosing a best vector from among the number of motion vectors;
applying a refining grid in a neighborhood of a position pointed by the best vector;
choosing a best position, in one of the preceding and subsequent fields, corresponding to the current block based on the operation of applying the refining grid; and
creating the temporal reconstruction by interpolating a block that includes the best position.

12. The method of claim 11, further comprising:
temporal de-interlacing the first block to obtain a temporal reconstruction of the first block; and
determining which of the spatial reconstruction and the temporal reconstruction of the first block minimizes a cost function, wherein the step of constructing the reconstructed image combines the second field with whichever of the spatial reconstruction and the temporal reconstruction of the first block minimizes the cost function.

13. The method of claim 11 wherein the work window constructed for the first pixel includes a first number of pairs of pixels and adaptively sizing the work window constructed for the second pixel includes:
using a second number of pairs of pixels for the work window of the second pixel, equal to the first number of pixels minus one, if the first pixel has been reconstructed using a pair of pixels corresponding to a vertical direction;
using a third number of pairs of pixels for the work window of the second pixel, equal to the first number of pairs of pixels plus one, if the first pixel has been reconstructed using a pair of pixels corresponding to a steepest slope possible;
using the first number of pairs of pixels for the work window of the second pixel in other cases.

14. A method for de-interlacing a digital image that includes interlaced first and second fields, the first field including first and second blocks of pixels, comprising:
spatial de-interlacing the first block to obtain a spatial reconstruction;
temporal de-interlacing the second block to obtain a temporal reconstruction; and
constructing a reconstructed image by combining the spatial reconstruction and temporal reconstruction with the second field, wherein the spatial de-interlacing step includes, for each pixel of the first block:
constructing a work window that includes pixels of the second field adjacent to the pixel of the first block, and intermediate pixels created based on a plurality of the pixels of the second field adjacent to the pixel of the first block; and
creating for the spatial reconstruction a reconstructed pixel corresponding to the pixel of the first block by performing linear interpolation on pairs of pixels of the work window, wherein the first block includes first and second pixels and the spatial de-interlacing step includes adaptively sizing the work window constructed for the second pixel based on the creating step performed for the first pixel, wherein the temporal de-interlacing includes non-balanced estimation, which includes:
generating a first vector that points to a first pixel in a preceding field and a second vector that points to a second pixel in a subsequent field with respect to the first field;
creating a first refining grid of pixels that includes the first pixel and a second refining grid pixels that includes the second pixel;
determining a third vector that points to one of the pixels in the first refining grid and a fourth vector that points to one of the pixels in the second refining grid; and
creating the temporal reconstruction by interpolating a first block that includes the pixel pointed to by the third vector and second block that includes the pixel pointed to by the fourth vector.

15. The method of claim 11 wherein the temporal de-interlacing includes unidirectional estimation, which includes reconstructing the first block starting from a block corresponding to the first block in the second field and from just one of a preceding field and a subsequent field.

16. A method for de-interlacing digital images, comprising:
spatial de-interlacing a digital image to obtain a spatial reconstruction;
applying, to said digital image, one or more de-interlacing procedures of a temporal type to obtain one or more temporal reconstructions; and
selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function, wherein said cost function is a variance of said spatial reconstruction and said one or more temporal reconstructions with respect to a block to be reconstructed of the digital image, wherein said variance is defined as a difference between a second order moment and a first order moment of values of pixels of a block being reconstructed, and wherein said selecting includes applying a median filter function that chooses which of said spatial reconstruction and temporal reconstructions has a variance corresponding to a median of the variances of said spatial reconstruction and temporal reconstructions.

17. A method for de-interlacing digital images, comprising:
spatial de-interlacing a digital image to obtain a spatial reconstruction;
applying, to said digital image, one or more de-interlacing procedures of a temporal type to obtain one or more temporal reconstructions; and
selecting from among said spatial reconstruction and said one or more temporal reconstructions, said selecting operation including the operations of applying a cost function to said spatial reconstruction and said one or more temporal reconstructions and choosing whichever of said spatial reconstruction and temporal reconstructions minimizes said cost function, wherein said spatial de-interlacing includes:
operating on a work window of pixels of said digital image adjacent to a pixel to be reconstructed by performing linear interpolation on pairs of pixels belonging to said work window,
extending the work window to a number of pairs of adjacent pixels greater than or equal to three, and
adaptively sizing said work window by varying in an adaptive way a number of pairs of pixels that are considered during each instance of the linear interpolation operation, said varying in an adaptive way including:
using a first number of pairs of pixels for reconstructing a first pixel, and
using for reconstructing a second pixel a work window that comprises a second number of pairs of pixels, the second number of pairs of pixels being determined starting from the first number of pairs of pixels according to the following criteria:
if the first pixel has been reconstructed using a pair of pixels corresponding to the vertical direction, then the second number of pairs of pixels is equal to the first number of pixels minus one,
if the first pixel has been reconstructed using the pair of original pixels corresponding to a steepest slope possible, then the second number of pairs of pixels is equal to the first number of pairs of pixels plus one,
in all the other cases, the second number of pairs of pixels is equal to the first number, and
in any case, the second number of pairs of pixels must be greater than or equal to three and smaller than or equal to a maximum number of pairs of pixels determined a priori.

18. The method according to claim 17, wherein said cost function is chosen as a variance defined as a difference between a first order moment and a first order moment of values of pixels of a block being reconstructed, and wherein said comparing includes applying a median filter function that chooses which of said spatial reconstruction and temporal reconstructions has a variance corresponding to a median of the variances of said spatial reconstruction and temporal reconstructions.

19. The method according to claim 17 wherein said spatial de-interlacing comprises post-processing and final filtering the spatial reconstruction, wherein said post-processing and final filtering the spatial reconstruction is varied dynamically according to a degree of correlation with a pixel being reconstructed.

20. A method for de-interlacing a digital image that includes interlaced first and second fields, the first field including first and second blocks of pixels, comprising:
spatial de-interlacing the first block to obtain a spatial reconstruction;
temporal de-interlacing the second block to obtain a temporal reconstruction; and
constructing a reconstructed image by combining the spatial reconstruction and temporal reconstruction with the second field, wherein the temporal de-interlacing includes:
testing a number of motion vectors temporally and spatially preceding a current one of the blocks to be reconstructed,
choosing a best vector from among the number of motion vectors,
applying a refining grid in a neighborhood of a position pointed by the best vector,
choosing a best position, in one of the preceding and subsequent fields, corresponding to the current block based on the operation of applying the refining grid, and
creating the temporal reconstruction by interpolating a block that includes the best position.

21. The method according to claim 20, further comprising:
obtaining a first block temporal reconstruction by temporal de-interlacing the first block; and
selecting from among said spatial reconstruction and said first block temporal reconstruction, said selecting operation including applying a cost function to said spatial reconstruction and said first block temporal reconstruction and choosing whichever of said spatial reconstruction and first block temporal reconstruction minimizes said cost function, wherein said cost function is chosen as a variance defined as a difference between a first order moment and a first order moment of values of pixels of a block being reconstructed, and wherein said selecting includes applying a median filter function that chooses which of said spatial reconstruction and temporal reconstructions has a variance corresponding to a median of the variances of said spatial reconstruction and temporal reconstructions.

22. The method according to claim 20 wherein said spatial de-interlacing comprises post-processing and final filtering the spatial reconstruction, wherein said post-processing and final filtering the spatial reconstruction is varied dynamically according to a degree of correlation with a pixel being reconstructed.

23. A method for de-interlacing a digital image that includes interlaced first and second fields, the first field including first and second blocks of pixels, comprising:
 spatial de-interlacing the first block to obtain a spatial reconstruction;
 temporal de-interlacing the second block by applying a non-balanced estimation to obtain a temporal reconstruction, including:
  generating a first vector that points to a first pixel in a preceding field and a second vector that points to a second pixel in a subsequent field with respect to the first field,
  creating a first refining grid of pixels that includes the first pixel and a second refining grid pixels that includes the second pixel,
  determining a third vector that points to one of the pixels in the first refining grid and a fourth vector that points to one of the pixels in the second refining grid, and
  creating the temporal reconstruction by interpolating a first block that includes the pixel pointed to by the third vector and second block that includes the pixel pointed to by the fourth vector; and
 constructing a reconstructed image by combining the spatial reconstruction and temporal reconstruction with the second field.

24. The method according to claim 23, further comprising:
 obtaining a first block temporal reconstruction by temporal de-interlacing the first block; and
 selecting from among said spatial reconstruction and said first block temporal reconstruction, said selecting operation including applying a cost function to said spatial reconstruction and said first block temporal reconstruction and choosing whichever of said spatial reconstruction and first block temporal reconstruction minimizes said cost function, wherein said cost function is chosen as a variance defined as a difference between a first order moment and a first order moment of values of pixels of a block being reconstructed, and wherein said selecting includes applying a median filter function that chooses which of said spatial reconstruction and temporal reconstructions has a variance corresponding to a median of the variances of said spatial reconstruction and temporal reconstructions.

25. The method according to claim 23 wherein said spatial de-interlacing comprises post-processing and final filtering the spatial reconstruction, wherein said post-processing and final filtering the spatial reconstruction is varied dynamically according to a degree of correlation with a pixel being reconstructed.

* * * * *

UNITED STATES PATENT AND TRADEMARK OFFICE
CERTIFICATE OF CORRECTION

| | | |
|---|---|---|
| PATENT NO. | : 7,375,763 B2 | Page 1 of 1 |
| APPLICATION NO. | : 10/925884 | |
| DATED | : May 20, 2008 | |
| INVENTOR(S) | : Daniele Alfonso et al. | |

It is certified that error appears in the above-identified patent and that said Letters Patent is hereby corrected as shown below:

<u>Column 15</u>
Line 20, "operation of reconstructing the current block staffing from" should read as -- operation of reconstructing the current block starting from --

Signed and Sealed this

Second Day of September, 2008

JON W. DUDAS
*Director of the United States Patent and Trademark Office*